US012773794B2

(12) United States Patent
Zhang et al.

(10) Patent No.: US 12,773,794 B2
(45) Date of Patent: Oct. 27, 2026

(54) FINGER JOINT TRANSMISSION STRUCTURE OF ANTHROPOMORPHIC ROBOT HAND

(71) Applicants: Yisi Zhang, Bundoora (AU); Eric Huwald, Bundoora (AU)

(72) Inventors: Yisi Zhang, Bundoora (AU); Eric Huwald, Bundoora (AU)

( * ) Notice: Subject to any disclaimer, the term of this patent is extended or adjusted under 35 U.S.C. 154(b) by 485 days.

(21) Appl. No.: 18/533,774

(22) Filed: Dec. 8, 2023

(65) Prior Publication Data

US 2024/0190023 A1 Jun. 13, 2024

(30) Foreign Application Priority Data

Dec. 13, 2022 (TW) ................................. 111147860

(51) Int. Cl.

*B25J 15/08* (2006.01)
*B25J 9/10* (2006.01)
*B25J 9/12* (2006.01)

(52) U.S. Cl.

CPC ............... *B25J 15/08* (2013.01); *B25J 9/102* (2013.01); *B25J 9/126* (2013.01)

(58) Field of Classification Search

CPC ..... A61F 2/586; A61F 2002/587; B25J 9/102; B25J 9/126; B25J 15/0009; B25J 15/0213; B25J 15/024; B25J 15/026; B25J 15/0293; B25J 15/08; B25J 15/083; B25J 15/086; B25J 15/10; B25J 15/103; B25J 15/106; B25J 15/12; B25J 17/0283; Y10T 74/1913

USPC .......................................................... 294/213

See application file for complete search history.

(56) References Cited

U.S. PATENT DOCUMENTS

| | | | | | |
|---|---|---|---|---|---|
| 4,623,183 | A * | 11/1986 | Aomori | B25J 15/103 414/730 |
| 5,967,580 | A * | 10/1999 | Rosheim | B25J 17/0275 901/29 |
| 10,794,453 | B2 * | 10/2020 | Weir | F16H 57/023 |
| 11,351,042 | B2 * | 6/2022 | Jury | A61F 2/583 |
| 11,597,102 | B2 * | 3/2023 | Grant | A61B 34/30 |
| 12,017,346 | B2 * | 6/2024 | Sun | B25J 9/1085 |
| 2008/0034920 | A1 * | 2/2008 | Inoue | B25J 9/104 901/29 |

(Continued)

FOREIGN PATENT DOCUMENTS

| | | | | |
|---|---|---|---|---|
| CN | 101486191 A * | 7/2009 | B25J 15/0009 |
| CN | 112025754 A * | 12/2020 | B25J 9/126 |
| DE | 102018112633 A1 * | 11/2019 | B25J 19/068 |

*Primary Examiner* — Joshua E Rodden

(74) *Attorney, Agent, or Firm* — Rosenberg, Klein & Lee

(57) ABSTRACT

A finger joint transmission structure of an anthropomorphic robot hand includes a first finger segment and a second finger segment that are pivotally connected to each other. A toothed rack in an arc shape is provided at the joint of the first finger segment and the second finger segment. The second finger segment has a speed reducer and a motor connected to the speed reducer therein. The speed reducer has a transmission shaft extending toward the toothed rack. A transmission gear meshing with the toothed rack is provided on the transmission shaft. When the motor drives the transmission shaft to rotate via the speed reducer, the transmission gear is synchronously driven to move along the toothed rack, so that the second finger segment is driven to be pivoted upward or downward at a predetermined angle relative to the first finger segment.

4 Claims, 8 Drawing Sheets

(56) References Cited

U.S. PATENT DOCUMENTS

| | | | | |
|---|---|---|---|---|
| 2012/0079904 | A1* | 4/2012 | Teng | B25J 9/102<br>74/380 |
| 2013/0055842 | A1* | 3/2013 | Okada | B25J 17/0283<br>901/29 |
| 2018/0353249 | A1* | 12/2018 | Marshall | A61B 34/30 |
| 2019/0184551 | A1* | 6/2019 | Shafer | B25J 9/102 |
| 2019/0216552 | A1* | 7/2019 | Palmowski | A61B 34/30 |
| 2025/0375905 | A1* | 12/2025 | Goldsmith | B25J 15/0009 |

* cited by examiner

FINGER JOINT TRANSMISSION STRUCTURE OF ANTHROPOMORPHIC ROBOT HAND

FIELD OF THE INVENTION

The present invention relates to a robot hand mechanism, and more particularly to a finger joint transmission structure of an anthropomorphic robot hand.

BACKGROUND OF THE INVENTION

With the booming development of robotics industry, an anthropomorphic robot hand is a structure to simulate the human hand, so it can be like the human hand to perform specific tasks. The research on multi-finger robot hands focuses on the function of dexterity.

As to the existing anthropomorphic robot hands, they are designed to grasp objects. The finger segments are pivotally connected to one another and can be driven to move in a predefined degree of freedom. Chinese Patent No. CN108189065 discloses a bionic finger device. The finger segments of the finger are pivotally connected to one another via connecting rods. A linear drive element is connected to the connecting rod of the first finger segment. When the linear drive element is actuated, the connecting rods are linked to drive each finger segment to bend or straighten relative to one another. However, although this robot hand can imitate a human hand to grasp an object, the finger segments driven by the connecting rods have little degree of freedom. Besides, the bending motion of each finger segment cannot be individually controlled and accurately positioned, so the robot hand can only carry out simple grasping work.

In addition, there are other designs that use a rope to pull the pivoted finger segments to achieve bending or straightening motions, which mainly simulates a human tendon to pull the finger joints for corresponding pivoting motions. However, the drive unit of this robot hand for rolling the rope is relatively large in size, and the ropes to drive the fingers are separately wound on the robot hand. This makes the overall assembly of this robot hand more complex, and the bending motion of each finger segment cannot be individually controlled and accurately positioned. Accordingly, the inventor of the present invention has devoted himself based on his many years of practical experiences to solve these problems.

SUMMARY OF THE INVENTION

The primary object of the present invention is to provide a finger joint transmission structure of an anthropomorphic robot hand, which has the effects of simplifying the structure and assembly, effectively utilizing the space to reduce the volume and ensuring the reduction ratio, and has high flexibility and precise control.

In order to achieve the foregoing object, the finger joint transmission structure of the anthropomorphic robot hand provided by the present invention comprises a first finger segment, a second finger segment, and a transmission unit.

The first finger segment has a first pivot portion and a first joint portion at one end thereof. A toothed rack is provided on the first joint portion. The toothed rack is arranged in an arc shape along a Y-axis.

The second finger segment extends along an X-axis. The second finger segment is hollow and has an accommodating space therein. The second finger segment has a head end and a tail end opposite to the head end along the X-axis. The head portion of the second finger segment is pivotally connected to the first pivot portion of the first finger segment. The tail end has a second pivot portion and a second joint portion.

The transmission unit is disposed in the accommodating space. The transmission unit includes a speed reducer unit and a motor unit that are connected to each other along the X-axis. The speed reducer unit has a transmission shaft extending toward the first joint portion. A central axis of the transmission shaft is orthogonal to the Y-axis. A transmission gear is provided on the transmission shaft. The transmission gear meshes with the toothed rack. The speed reducer unit is configured to reduce a rotational speed of the motor unit to output power from the transmission shaft.

When the motor unit drives the transmission shaft to rotate via the speed reducer unit, the transmission gear is synchronously driven to move along the toothed rack, so that the second finger segment is driven to be pivoted upward or downward at a predetermined angle relative to the first finger segment.

DETAILED DESCRIPTION OF THE PREFERRED EMBODIMENTS

Figure 1:
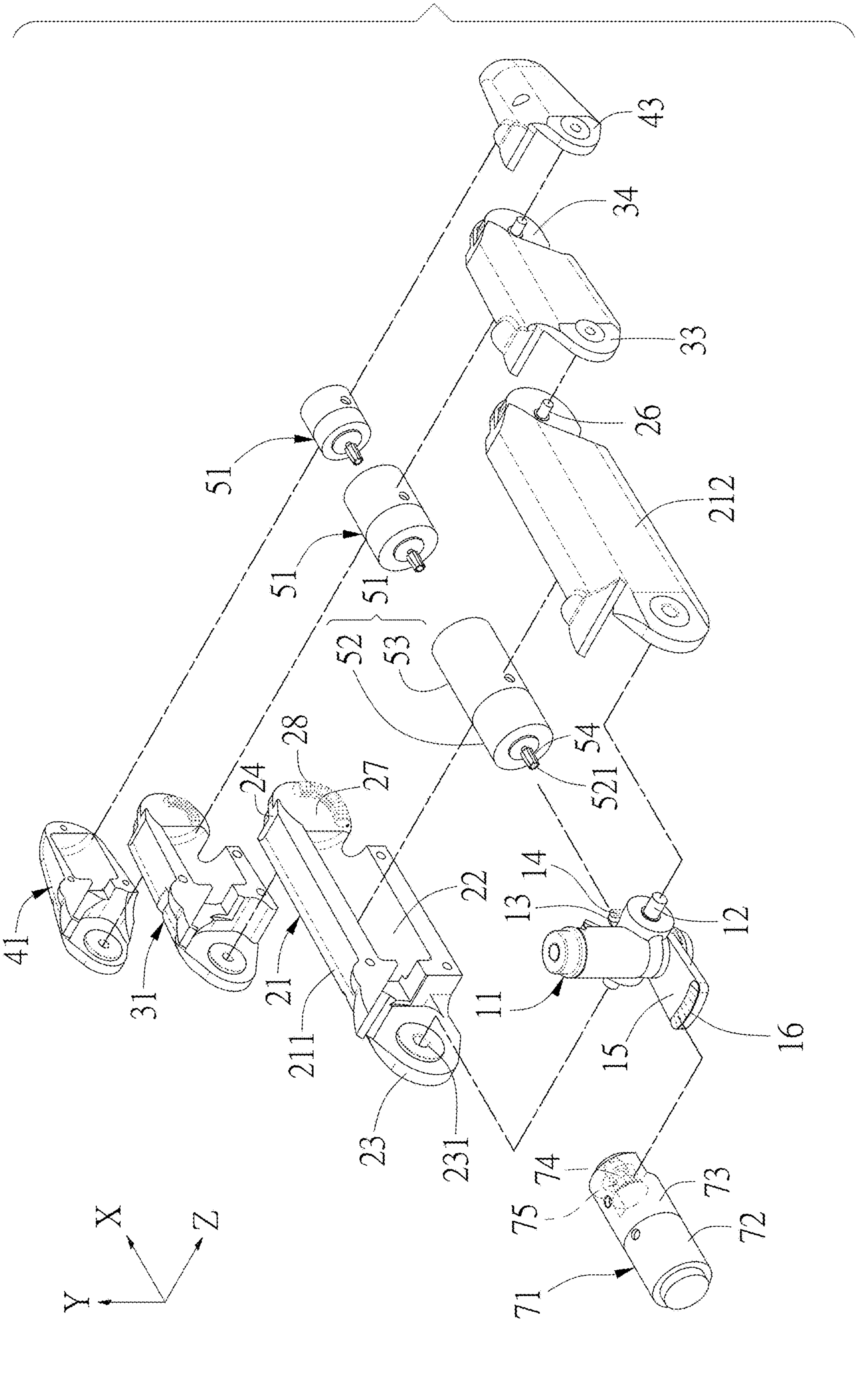
FIG. 1 is an exploded view of the present invention.
Figure 2:
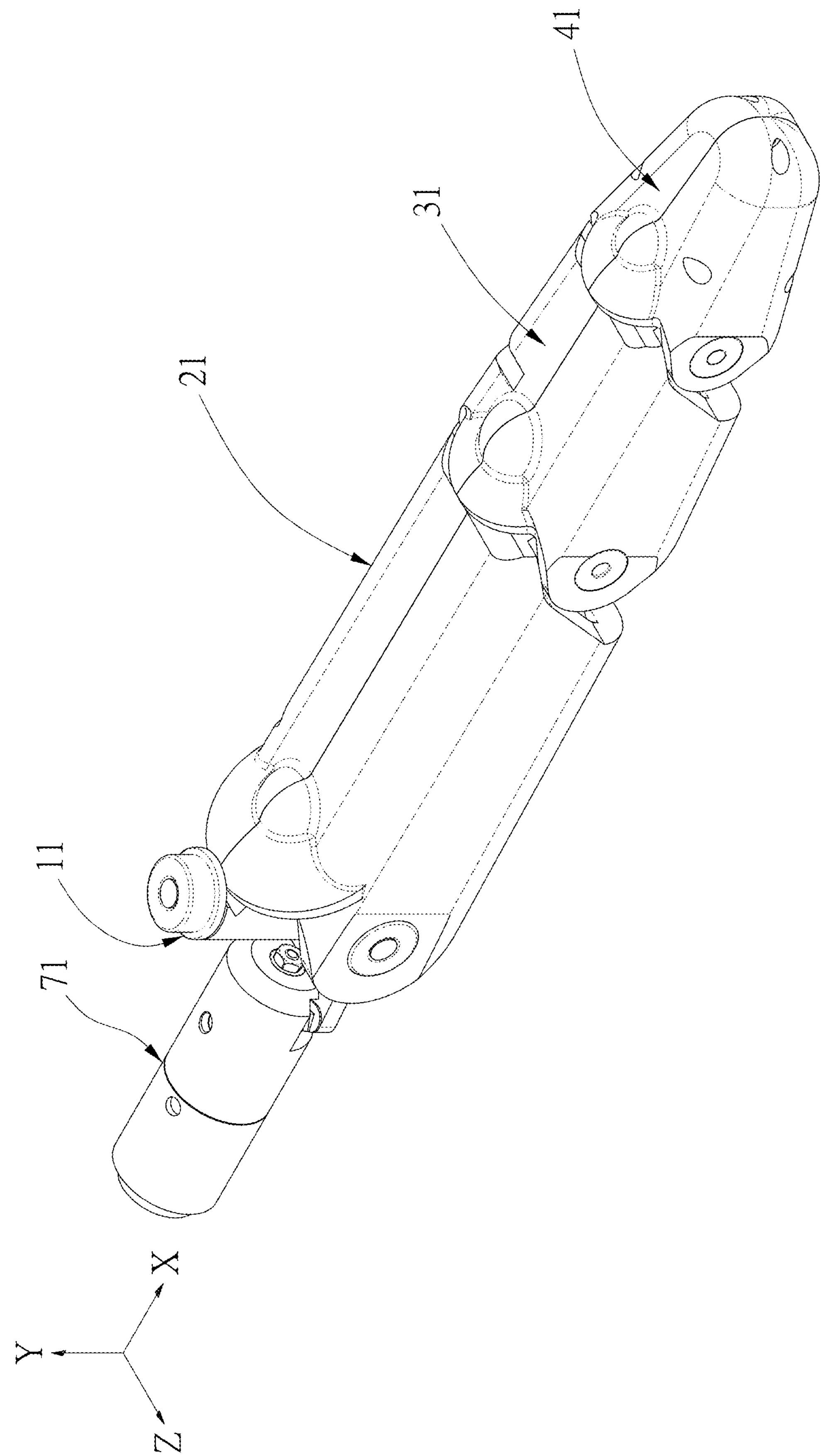
FIG. 2 is a perspective view of the present invention.
Figure 3:
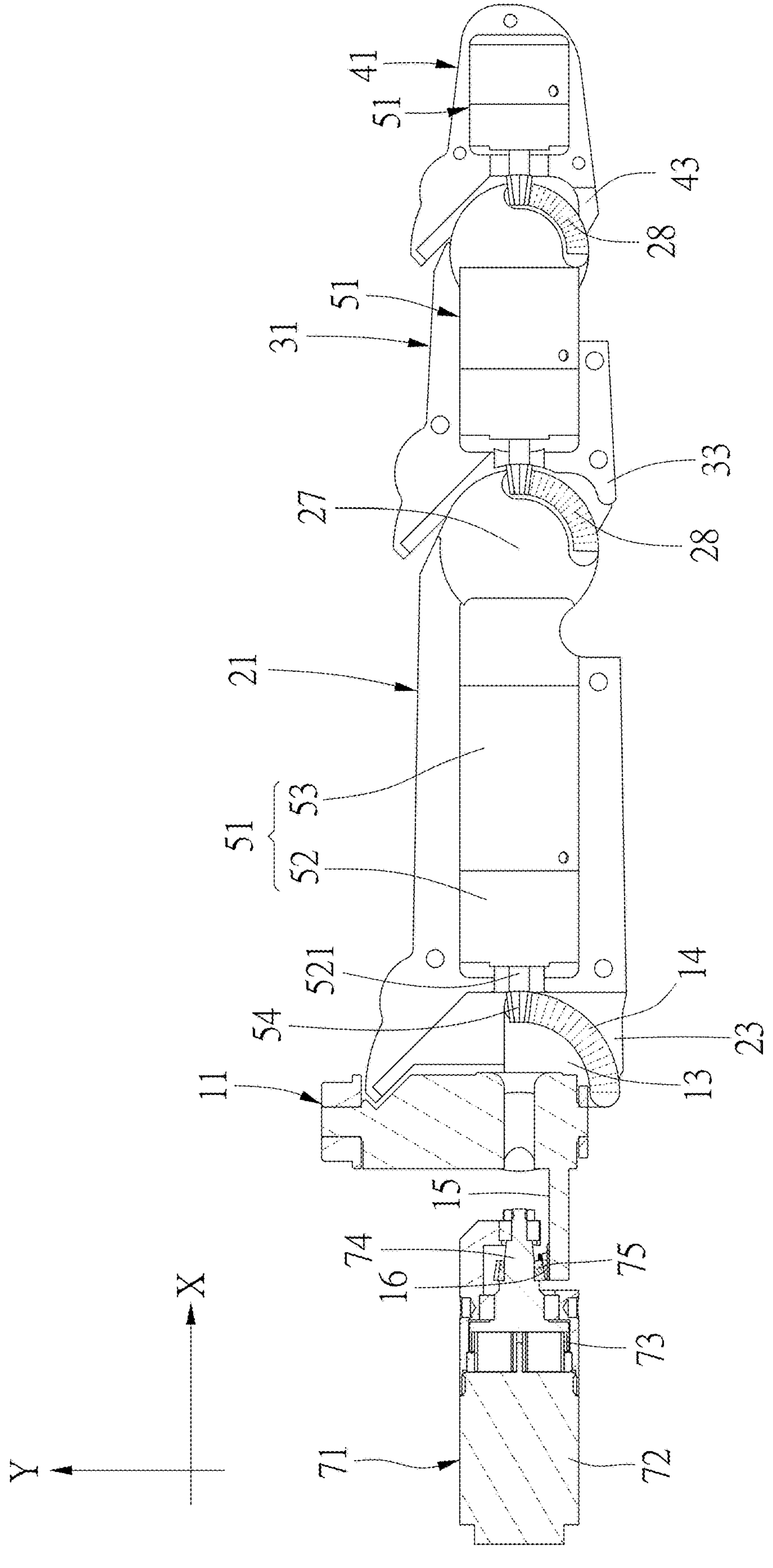
FIG. 3 is a schematic view showing the assembled structure of the present invention.
Figure 4:
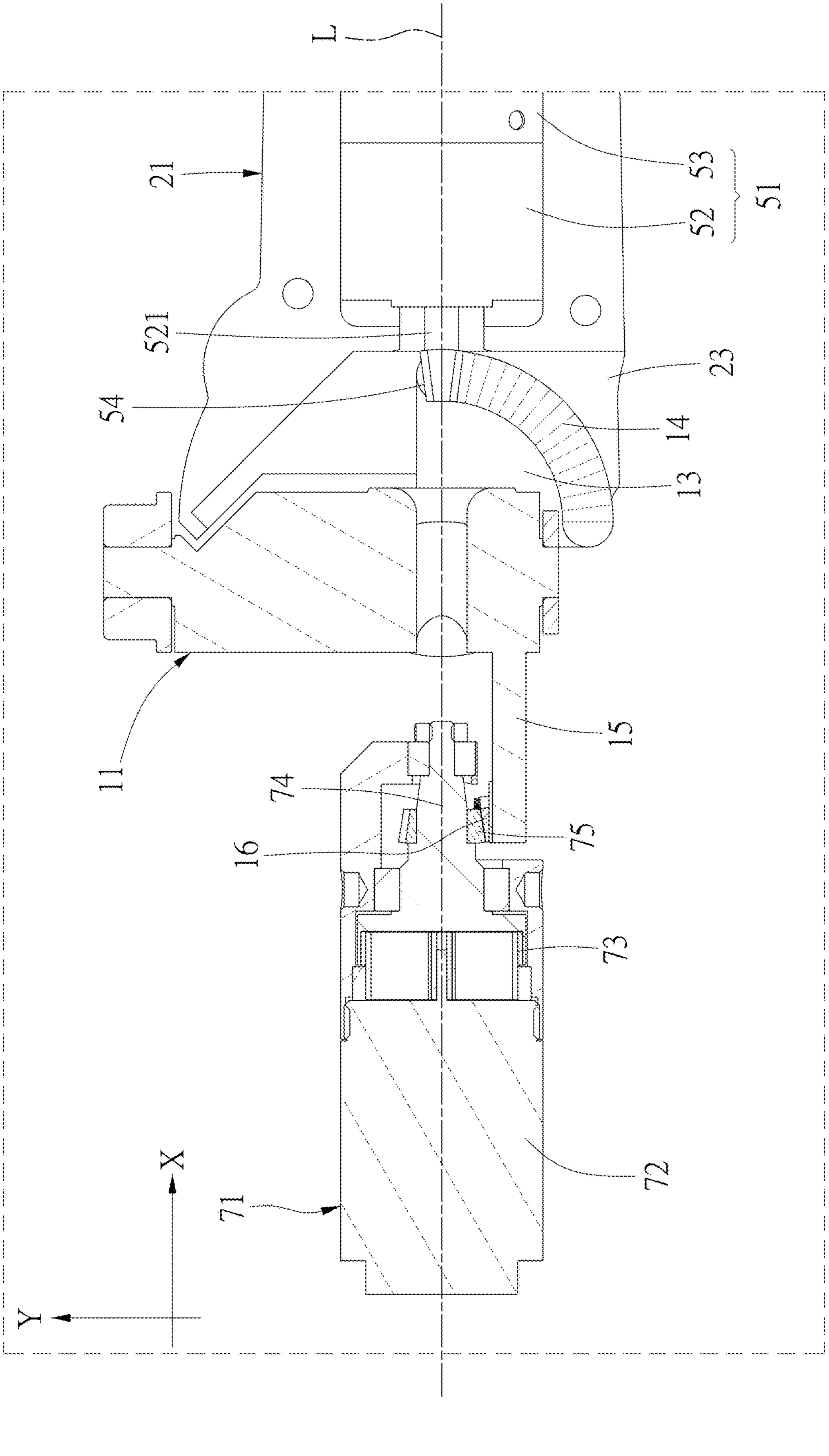
FIG. 4 is a partial enlarged view of FIG. 3.

Referring to FIG. 1 through FIG. 4, a finger joint transmission structure of an anthropomorphic robot hand provided by the present invention comprises a first finger segment 11, a second finger segment 21, a third finger segment 31 and a fourth finger segment 41 that are pivotally connected to one another in sequence. A transmission unit 51 is provided inside each of the first finger segment 11, the second finger segment 21, the third finger segment 31 and the fourth finger segment 41.

One end of the first finger segment 11 has a first pivot portion 12 in the form of a protruding post extending laterally along a Z-axis and a first joint portion 13 in the form of a plate protruding forward along an X-axis. A toothed rack 14 is provided on the first joint portion 13. The toothed rack 14 is arranged in an arc shape along a Y-axis.

The second finger segment 21 extends along the X-axis. The second finger segment 21 is hollow and has an accommodating space 22 therein. The accommodating space 22 extends along the X-axis. In this embodiment, the second finger segment 21 is composed of a first half shell 211 and a second half shell 212 that are assembled together. In other feasible embodiments, the second finger segment 21 may be composed of a hollow cylinder having at least one open end or a truss-type support frame. The present invention is not limited to the structure or manufacturing method of the finger segment itself. Two ends of the second finger segment 21 extending along the X-axis are defined as a head end 23 and a tail end 24 opposite to the head end 23, respectively.

The head end 23 of the second finger segment 21 has a through hole 231. The head end 23 of the second finger segment 21 is pivotally connected to the first pivot portion 12 of the first finger segment 11 via the through hole 231, and the first joint portion 13 is relatively accommodated in the head end 23. The tail end 24 has a second pivot portion 26 in the form of a protruding post extending laterally along the Z-axis and a second joint portion 27 in the form of a plate protruding forward along the X-axis. Another toothed rack 28 is provided on the second joint portion 27.

The transmission unit 51 is disposed in the accommodating space 22. The transmission unit 51 may be a reduction motor or a combination of a motor and a speed reducer. The transmission unit 51 includes a speed reducer unit 52 and a motor unit 53 that are connected to each other along the X-axis and arranged in series on the same central axis L. The motor unit 53 may be a servo motor. The speed reducer unit 52 has a transmission shaft 521 extending toward the first joint portion and located on the central axis L. The central axis L of the transmission shaft 521 is orthogonal to the Y-axis. A transmission gear 54 is provided on the transmission shaft 521. The transmission gear 54 meshes with the toothed rack 14. The transmission gear 54 may be a bevel gear or a hypoid gear. The speed reducer unit 52 is internally equipped with a preset reduction gear set (not shown in the figures), so that the speed reducer unit 52 can be used to reduce the rotational speed of the motor unit 53 and then output power from the transmission shaft 521. The speed reducer unit 52 can be a commonly used speed reducer, as long as it is able to reduce the rotational speed of the motor unit 53 to output a predetermined torque. Through the speed reducer unit 52 and the motor unit 53 that are connected in series on the same central axis L and arranged in the accommodating space 22, the transmission unit 51 can not only effectively utilize the space to reduce the overall volume but also can reduce losses caused by complex components, so as to ensure a sufficiently large reduction ratio in the process of transmission. When the motor unit 53 drives the transmission shaft 521 to rotate via the speed reducer unit 52, the transmission gear 54 will be driven to move along the toothed rack 14 for steadily driving the second finger segment 21 to be pivoted upward or downward at a predetermined angle along the Y-axis relative to the first finger segment 11, so that the second finger segment 21 can be pivoted relative to the first finger segment 11 between a straight position A and a bent position B. When the second finger segment 21 is in the straight position A, the central axis L of the transmission shaft 521 will be orthogonal to the Y-axis. The motor unit 53 may be equipped with an angle sensor for controlling the movement of the finger segment precisely and for simulating the bending and straightening movements of the human finger joints accurately.

Figure 5:
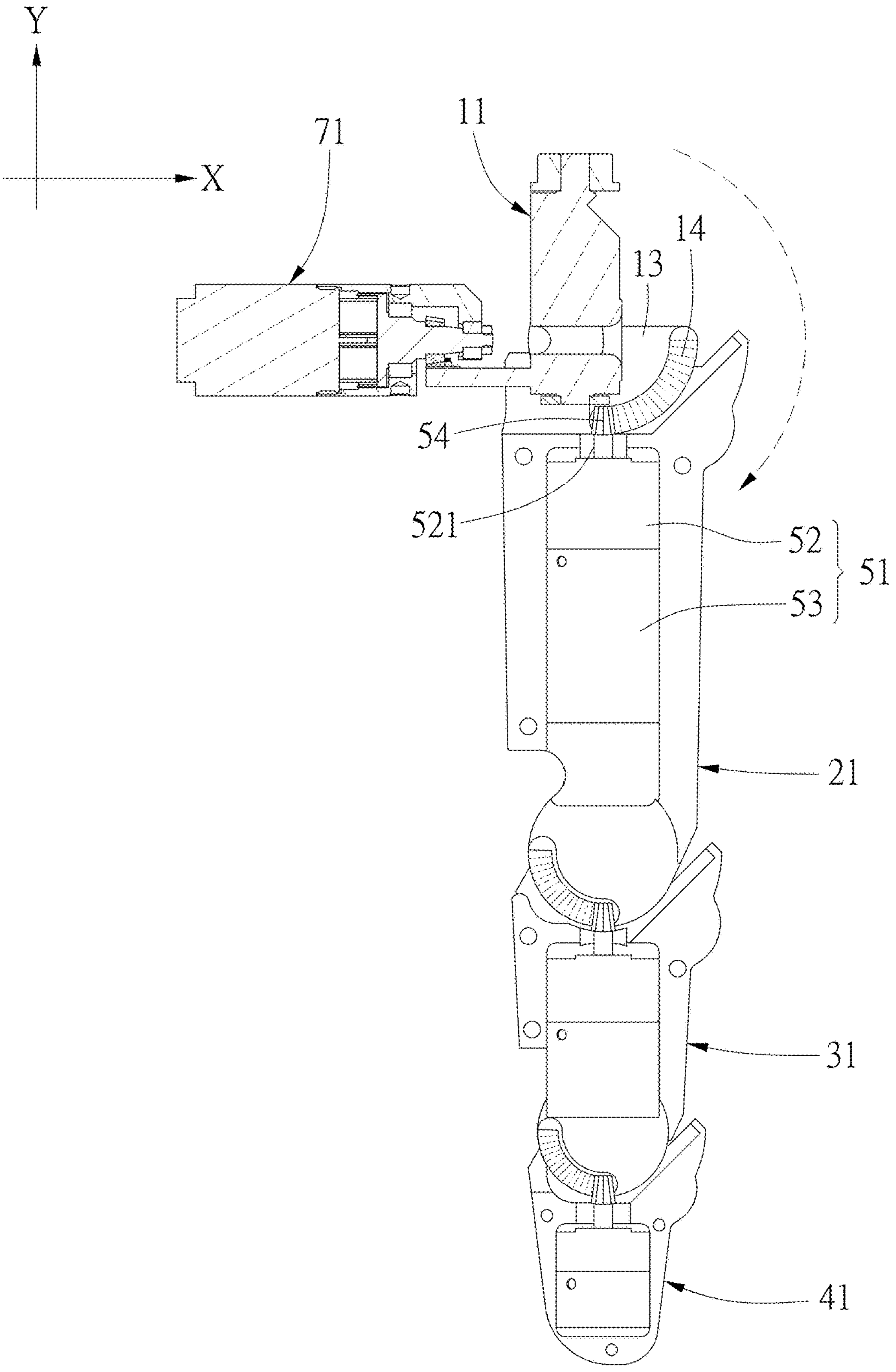
FIG. 5 and FIG. 6 are schematic views of the present invention, illustrating that the finger segments are pivoted downward.
Figure 6:
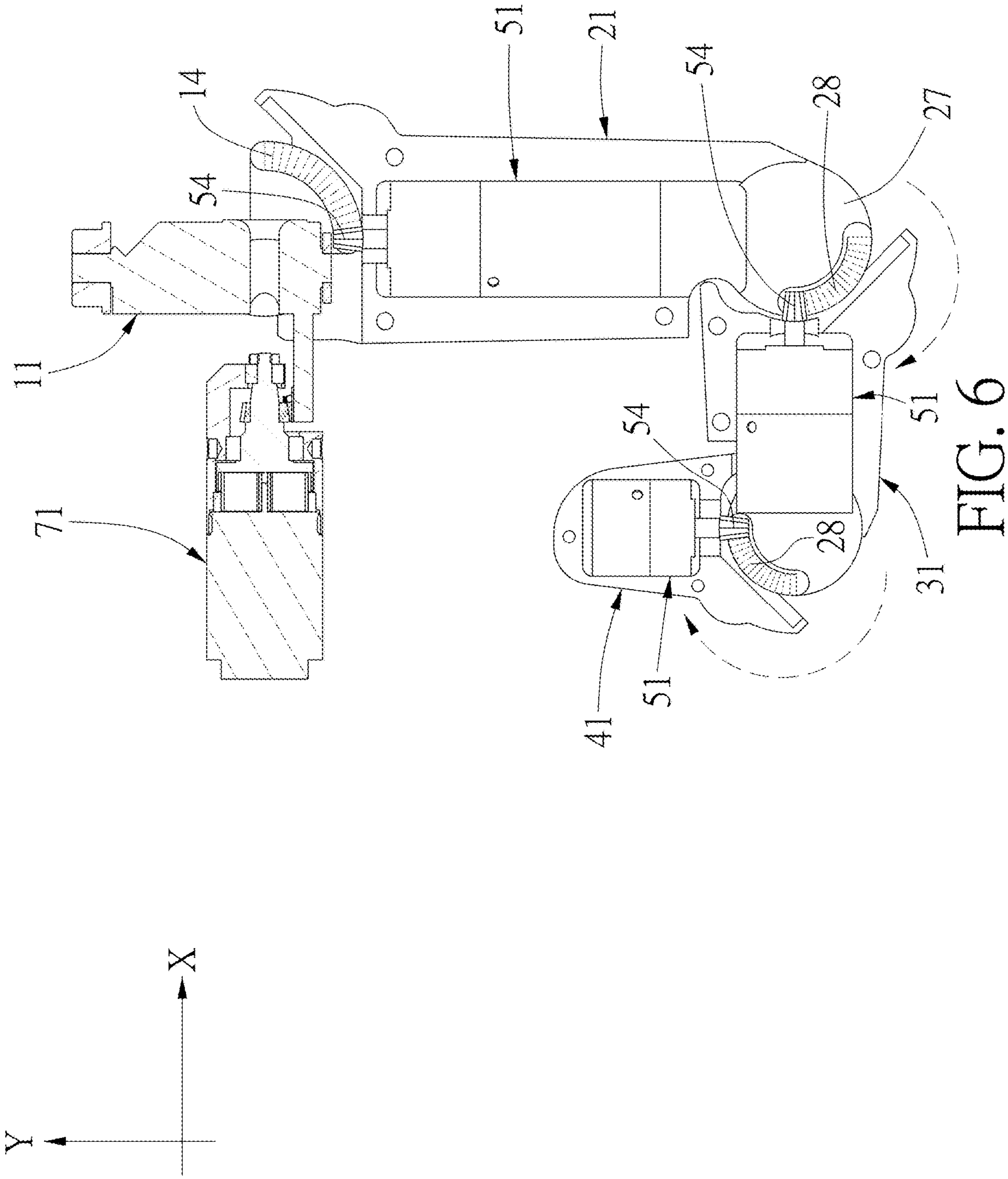

Further, a head end 33 of the third finger segment 31 is pivotally connected to the second pivot portion 26. A head end 43 of the fourth finger segment 41 is pivotally connected to a tail end 34 of the third finger segment 31. The third finger segment 31 and the fourth finger segment 41 also have the transmission unit 51 as the second finger segment 21. The toothed rack 28 in an arc shape is also provided at the tail end 34 of the third finger segment 31 as the second finger segment 21, such that the third finger segment 31 and the fourth finger segment 41 can be moved along the corresponding toothed racks 28 through their respective transmission gears 54 for driving the third finger segment 31 and the fourth finger segment 41 to be pivoted upward or downward at a predetermined angle along the Y-axis. Referring to FIG. 5 and FIG. 6, the corresponding finger segments can be driven to bend or straighten by driving the transmission units 51 of the second finger segment 21, the third finger segment 31 and the fourth finger segment 41 to rotate forward or reversely. Each joint of the finger segments of the present invention can be driven independently, providing high flexibility and precise control.

Figure 7:
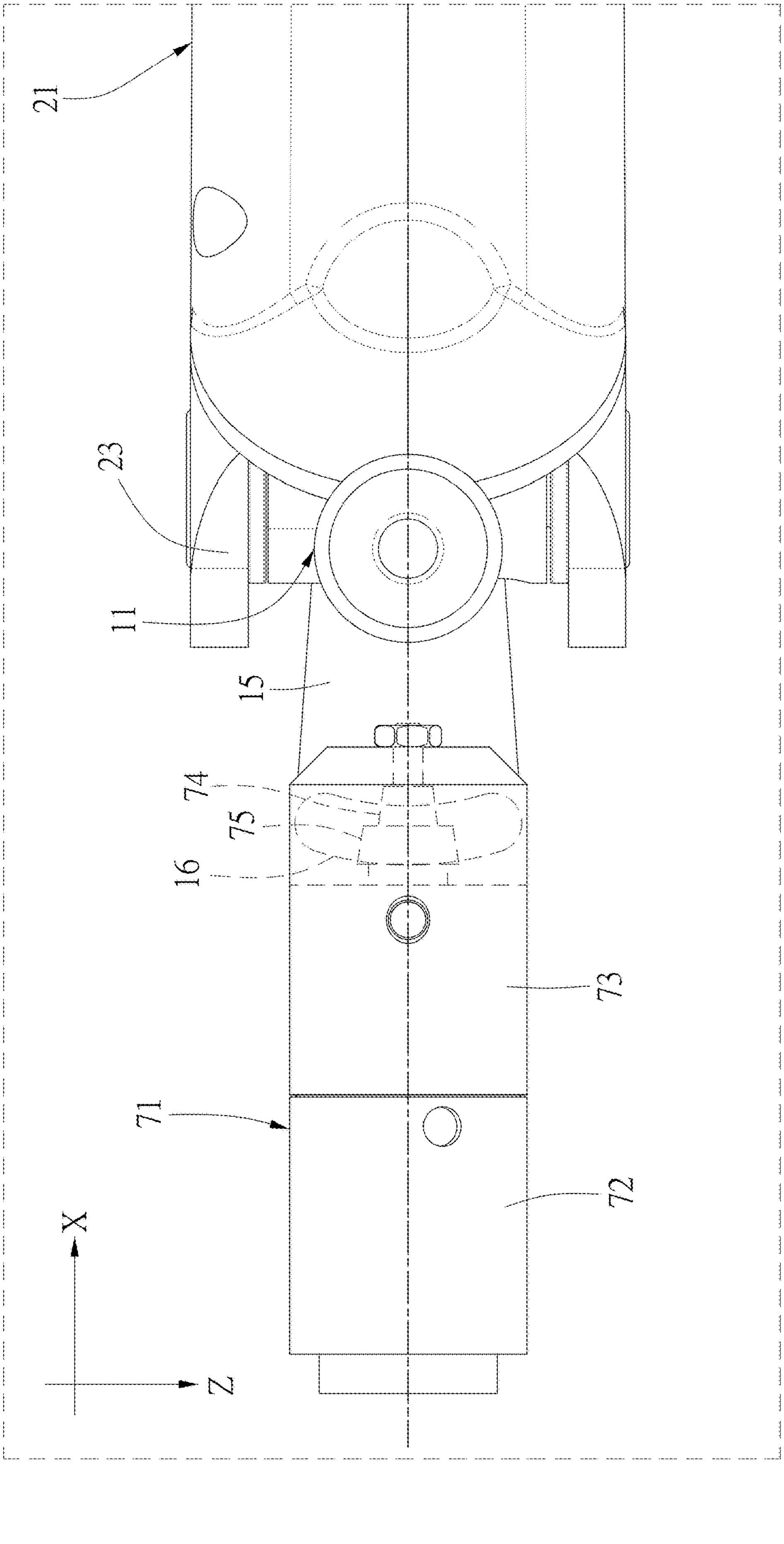
FIG. 7 and FIG. 8 are schematic views of the present invention, illustrating that the first finger segment is tilted sideward relative to the drive unit.
Figure 8:
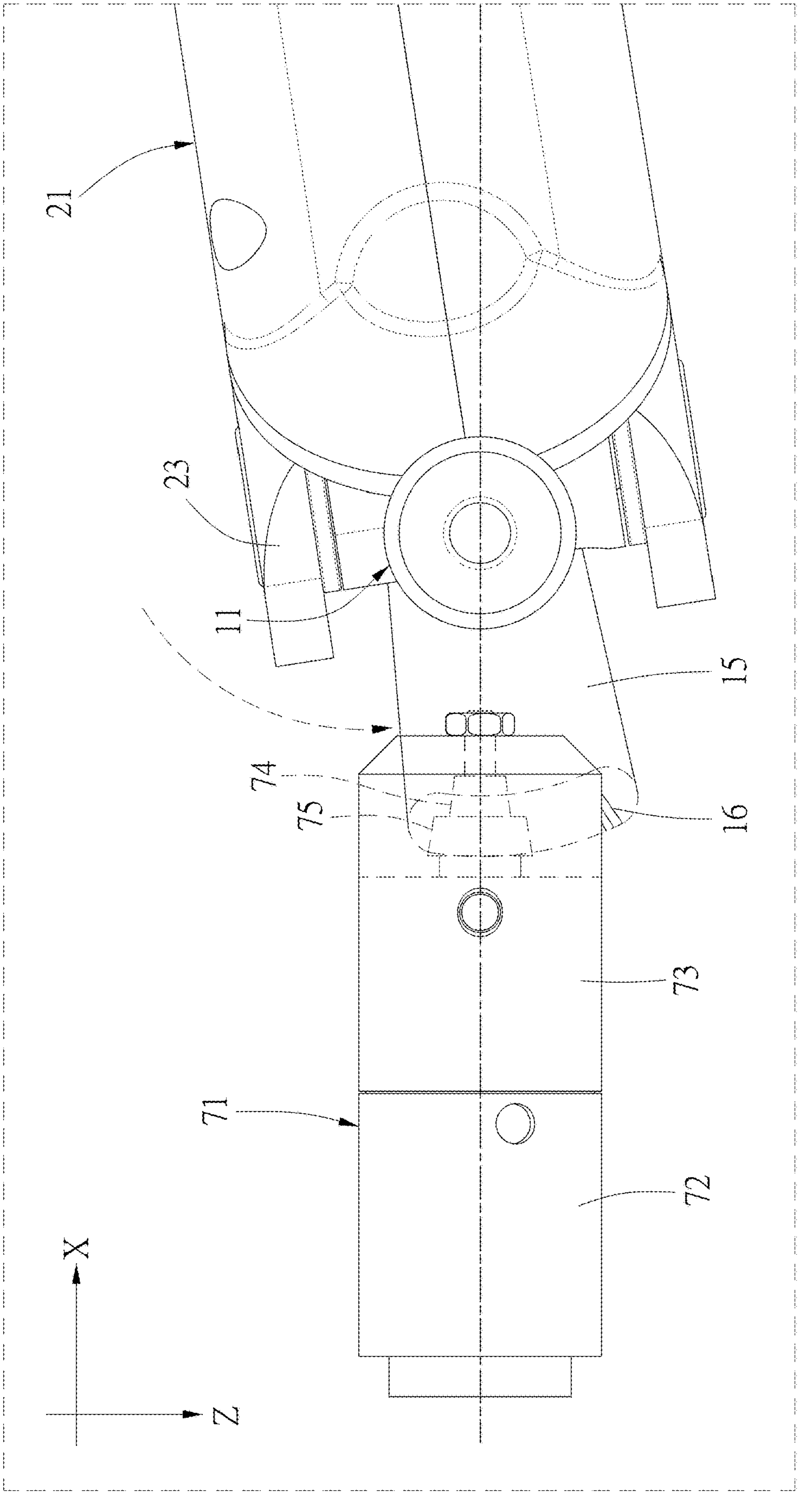

In addition, a support seat 15 is formed on the other end of the first finger segment 11. A drive toothed rack 16 is provided on the support seat 15. The drive toothed rack 16 is arranged in an arc shape along a Z-axis. A drive unit 71 includes a drive motor 72 and a second speed reducer 73 connected to the drive motor 72. The second speed reducer 73 has an output shaft 74 extending along the X-axis. The output shaft 74 and the transmission shaft 62 have the same central axis L. An output gear 75 that may be a bevel gear or a hypoid gear is connected to the periphery of the output shaft 74. The output gear 75 meshes with the drive toothed rack 16. When the drive motor 72 drives the output shaft 74 to run via the second speed reducer 73, the drive toothed rack 16 will be pushed by the output gear 75, as shown in FIG. 7 and FIG. 8, so that the first finger segment 11 can be driven steadily to tilt leftward or rightward at a predetermined angle along the Z-axis relative to the drive unit 71. Further, the other finger segments can be driven to perform lateral swing, so as to improve the flexibility of movement.

What is claimed is:

1. A finger joint transmission structure of an anthropomorphic robot hand, comprising:

a first finger segment, having a first pivot portion and a first joint portion at one end thereof, a toothed rack being provided on the first joint portion, the toothed rack being arranged in an arc shape along a Y-axis;

a second finger segment, extending along an X-axis, the second finger segment being hollow and having an accommodating space therein, the second finger segment having a head end and a tail end opposite to the head end along the X-axis, the head end of the second finger segment being pivotally connected to the first pivot portion of the first finger segment, the tail end having a second pivot portion and a second joint portion; and a transmission unit, disposed in the accommodating space, the transmission unit including a speed reducer unit and a motor unit that are connected to each other along the X-axis, the speed reducer unit having a transmission shaft extending toward the first joint portion, a central axis of the transmission shaft being orthogonal to the Y-axis, a transmission gear being provided on the transmission shaft, the transmission gear meshing with the toothed rack, the speed reducer unit being configured to reduce a rotational speed of the motor unit to output power from the transmission shaft;

wherein when the motor unit drives the transmission shaft to rotate via the speed reducer unit, the transmission gear is synchronously driven to move along the toothed rack so that the second finger segment is driven to be pivoted upward or downward at a predetermined angle relative to the first finger segment; wherein another toothed rack is provided on the second joint portion, the another toothed rack is arranged in an arc shape along the Y-axis; wherein a head end of a third finger segment is pivotally connected to the second pivot portion, the third finger segment also has the transmission unit as the second finger segment; wherein when the transmission gear of the third finger segment is moved along the another toothed rack, the third finger segment is driven to be pivoted upward or downward at another predetermined angle relative to the second finger segment.

2. The finger joint transmission structure of the anthropomorphic robot hand as claimed in claim 1, wherein the first pivot portion is in the form of a protruding post extending toward two opposing sides of the second finger segment along a Z-axis, the first joint portion is in the form of a plate protruding forward along the X-axis, the head end of the second finger segment has a through hole, the head end of the second finger segment is pivotally connected to the first pivot portion of the first finger segment via the through hole, and the first joint portion is relatively accommodated in the head end.

3. The finger joint transmission structure of the anthropomorphic robot hand as claimed in claim 1, wherein the speed reducer unit and the motor unit are connected in series on a same central axis and arranged in the accommodating space.

4. The finger joint transmission structure of the anthropomorphic robot hand as claimed in claim 1, wherein a support seat is formed on another end of the first finger segment, a drive toothed rack is provided on the support seat, the drive toothed rack is arranged in an arc shape along a Z-axis, a drive unit includes a drive motor and a second speed reducer connected to the drive motor, the second speed reducer has an output shaft, an output gear is connected to a periphery of the output shaft, the output gear meshes with the drive toothed rack, when the drive motor drives the output shaft to run via the second speed reducer, the drive toothed rack is pushed by the output gear, so that the first finger segment is driven to tilt leftward or rightward at a predetermined angle relative to the drive unit.

* * * * *